US012638340B2

(12) United States Patent
Golara et al.

(10) Patent No.: US 12,638,340 B2
(45) Date of Patent: May 26, 2026

(54) CMOS-BASED TEMPERATURE SENSOR WITH FULL BAND POWER SUPPLY REJECTION

(71) Applicant: Apple Inc., Cupertino, CA (US)

(72) Inventors: Soheil Golara, San Jose, CA (US); Daniel Joel Bankman, Cupertino, CA (US); Robin Gupta, Santa Clara, CA (US); Seyedeh Sedigheh Hashemi, Santa Clara, CA (US); Mansour Keramat, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 18/345,253

(22) Filed: Jun. 30, 2023

(65) Prior Publication Data

US 2025/0003809 A1    Jan. 2, 2025

(51) Int. Cl.
G01K 7/01 (2006.01)

(52) U.S. Cl.
CPC .................................... G01K 7/01 (2013.01)

(58) Field of Classification Search
CPC   G01K 7/00; G01K 7/01; G01K 7/015; G01K 7/16; G01K 7/18; G01K 7/32; G01K 7/34
USPC ................................... 327/512; 374/178–185
See application file for complete search history.

(56) References Cited

U.S. PATENT DOCUMENTS

| | | | |
|---|---|---|---|
| 7,075,847 | B2 | 7/2006 | Kim et al. |
| 9,748,969 | B1 | 8/2017 | Bach et al. |
| 9,859,848 | B2 | 1/2018 | Choo et al. |
| 10,151,608 | B2 | 12/2018 | Fontes et al. |
| 10,528,070 | B2 | 1/2020 | Coln et al. |
| 11,493,968 | B2 | 11/2022 | Eberlein |
| 11,502,700 | B2 | 11/2022 | Hunter |
| 11,619,958 | B2 | 4/2023 | Liang |
| 12,181,350 | B2 * | 12/2024 | Singh .................... G01K 15/005 |
| 12,235,169 | B2 * | 2/2025 | Chiang .................. G01K 3/005 |

(Continued)

FOREIGN PATENT DOCUMENTS

WO       WO-2020052957 A1      3/2020

OTHER PUBLICATIONS

U.S. Appl. No. 17/882,043, filed Aug. 5, 2022, entitled "CMOS-Based Temperature Sensor," Inventors Soheil Golara et al. (Not Published).

*Primary Examiner* — Hai L Nguyen
(74) *Attorney, Agent, or Firm* — Sterne, Kessler, Goldstein & Fox P.L.L.C.

(57) ABSTRACT

The present disclosure describes embodiments of a temperature sensor with full band PSR. The temperature sensor can include a reference voltage generator, a temperature circuit, and an analog-to-digital converter (ADC). The reference voltage generator is configured to generate a reference voltage. The temperature circuit is configured to operate under a substantially constant bias current and to generate a temperature signal proportional to temperature. The ADC is electrically coupled to the reference voltage generator and the temperature circuit and configured to convert the temperature signal to a digital representation based on a sampling frequency. The ADC comprises a frequency generator configured to generate a modulation frequency having a random variation. The sampling frequency is modulated by the modulation frequency.

20 Claims, 13 Drawing Sheets

(56) References Cited

U.S. PATENT DOCUMENTS

| 2023/0083084 A1 | 3/2023 | Golara et al. |
| 2023/0101413 A1 | 3/2023 | Vishwanath et al. |

* cited by examiner

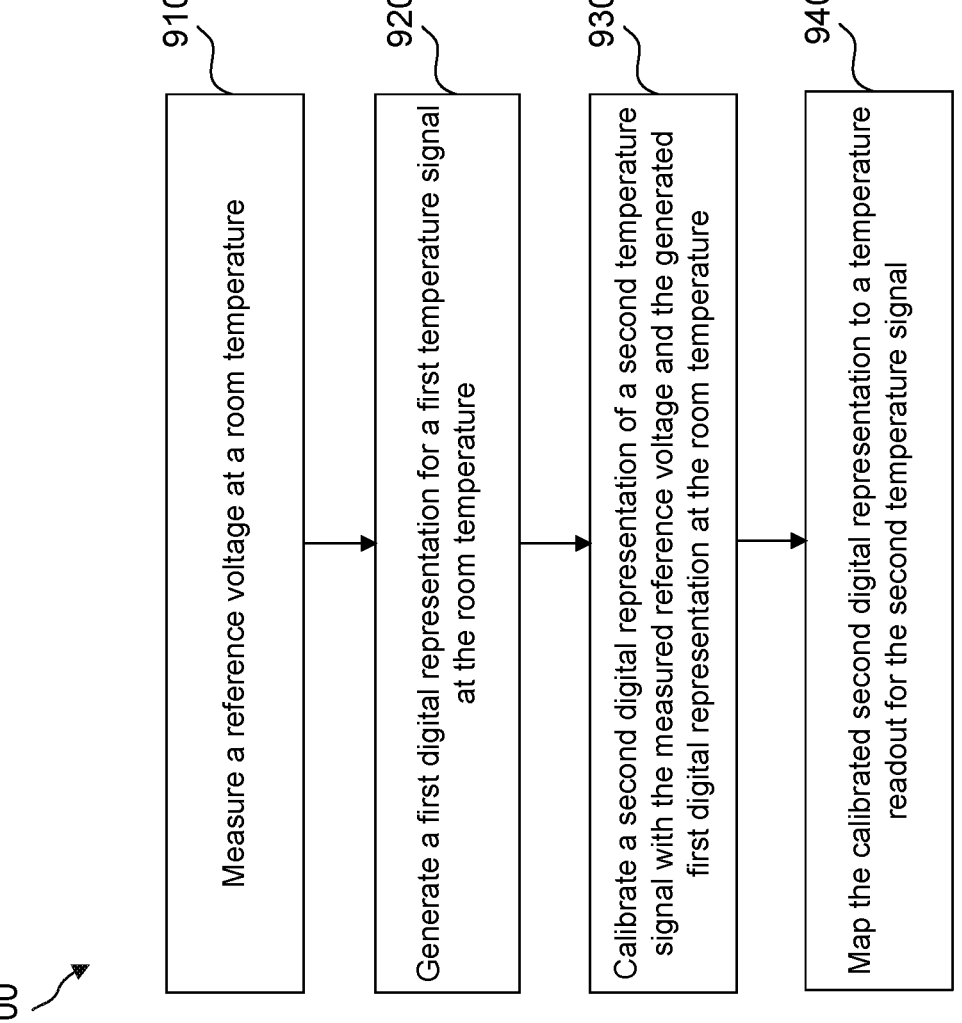

910 — Measure a reference voltage at a room temperature

920 — Generate a first digital representation for a first temperature signal at the room temperature 930 — Calibrate a second digital representation of a second temperature signal with the measured reference voltage and the generated first digital representation at the room temperature 940 — Map the calibrated second digital representation to a temperature readout for the second temperature signal

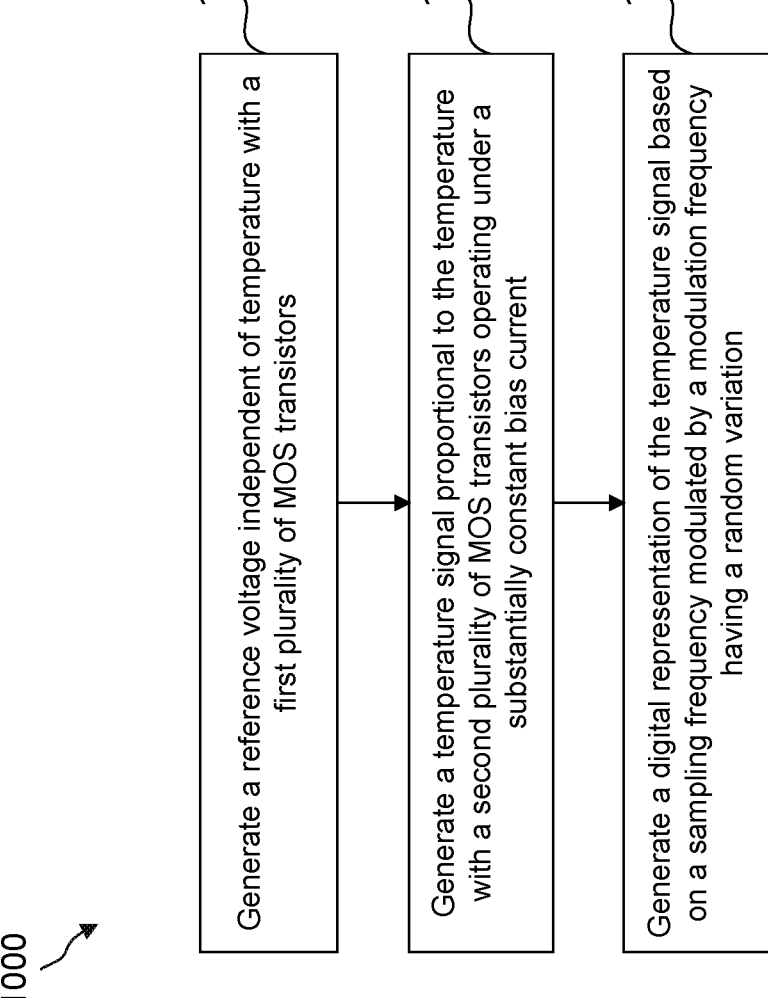

1000

1010

Generate a reference voltage independent of temperature with a first plurality of MOS transistors

1020

Generate a temperature signal proportional to the temperature with a second plurality of MOS transistors operating under a substantially constant bias current

1030

Generate a digital representation of the temperature signal based on a sampling frequency modulated by a modulation frequency having a random variation

FIG. 10

CMOS-BASED TEMPERATURE SENSOR WITH FULL BAND POWER SUPPLY REJECTION

FIELD

This disclosure relates to analog circuits in computer systems and, more particularly, to a complementary metal-oxide-semiconductor (CMOS)-based temperature sensor with full band power supply rejection (PSR).

BACKGROUND

Modern computer systems include multiple circuit blocks designed to perform various functions. For example, such circuit blocks can include processors or processor cores configured to execute software or program instructions. Additionally, the circuit blocks can include memory, mixed-signal or analog circuits, and the like.

In some computer systems, certain areas of the circuit blocks may overheat and lead to functional failures of the circuit blocks during operation. A temperature sensor can be integrated into such computer systems for temperature monitoring and system protection. The temperature sensor can provide temperature information to prevent the computer system from overheating.

SUMMARY

Various embodiments of a CMOS-based temperature sensor with full band PSR are disclosed. In some embodiments, a circuit includes a reference voltage generator, a temperature circuit, and an analog-to-digital converter (ADC). The reference voltage generator is configured to generate a reference voltage. The temperature circuit is configured to operate under a substantially constant bias current and to generate a temperature signal proportional to absolute temperature. The ADC is electrically coupled to the reference voltage generator and the temperature circuit and configured to convert the temperature signal to a digital representation based on a sampling frequency. The ADC comprises a frequency generator configured to generate a modulation frequency having a random variation. The sampling frequency is modulated by the modulation frequency.

In some embodiments, a metal-oxide-semiconductor (MOS)-based temperature sensor includes a reference voltage generator configured to generate a reference voltage with a first set of MOS transistors, a temperature circuit configured to generate a temperature signal with a second set of MOS transistors, and an ADC electrically coupled to the reference voltage and the temperature circuit and configured to sample the temperature signal with a sampling frequency modulated by a modulation frequency having a random variation. The temperature circuit includes a current source configured to generate a substantially constant bias current for the second set of MOS transistors.

In some embodiments, a method includes generating a reference voltage independent of temperature with a first set of metal-oxide-semiconductor (MOS) transistors, generating, based on the reference voltage, a temperature signal proportional to the temperature with a second set of MOS transistors operating under a substantially constant bias current, and generating a digital representation of the temperature signal based on a sampling frequency modulated by a modulation frequency having a random variation.

BRIEF DESCRIPTION OF THE DRAWINGS

Aspects of the present disclosure are best understood from the following detailed description when read with the accompanying figures.

FIG. 9 illustrates a method for calibrating a CMOS-based temperature sensor with a one-point calibration process, according to some embodiments.

FIG. 10 illustrates a method for operating a CMOS-based temperature sensor with full band PSR, according to some embodiments.

DETAILED DESCRIPTION

Figure 1:
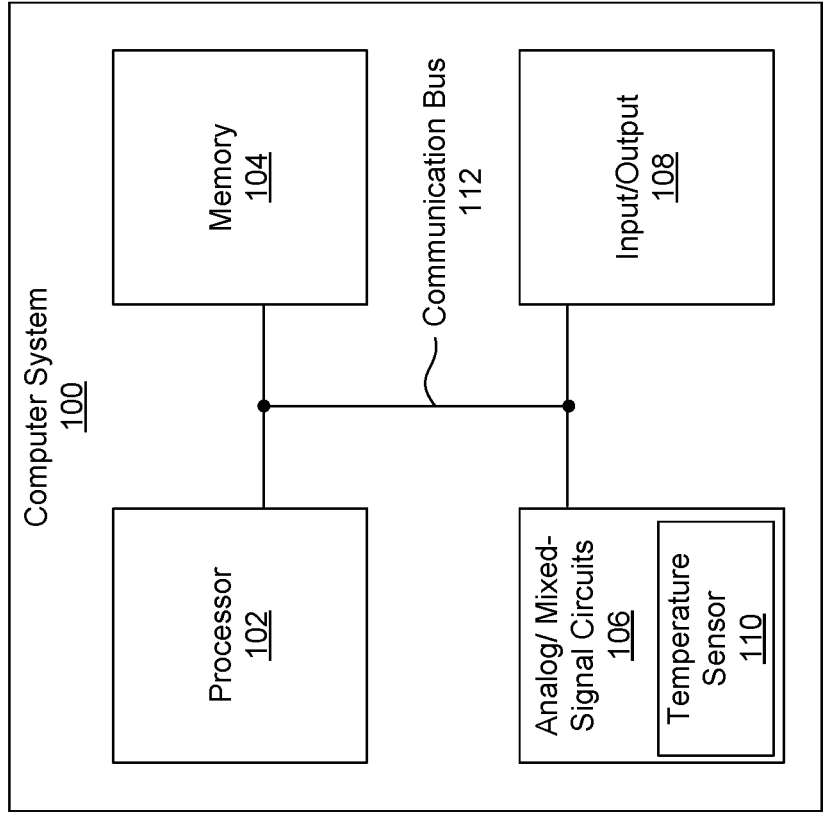
FIG. 1 illustrates a computer system that includes a CMOS-based temperature sensor with full band PSR, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

In some embodiments, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

Temperature sensors can be integrated in a computer system, such as a central processing unit (CPU), a graphics processing unit (GPU), and a system on a chip (SoC), to monitor temperature. Based on the temperature information, the computer system can reduce or interrupt an operation to avoid overheating or functional failures. The computer system can also use the temperature information to adjust performance of certain electronic components. An accurate temperature readout is thus important for computer systems.

However, circuit issues (e.g., offset and gain, power supply noise) and production issues (e.g., mechanical stress) can affect the accuracy and precision of temperature readouts. For example, a temperature sensor can include a temperature front-end circuit to receive an on-chip temperature signal, an analog-to-digital converter (ADC) to convert the temperature signal to a digital representation, a mapping circuit to map the digital representation to a temperature readout, and a calibration circuit to calibrate the temperature sensor at a single temperature or multiple temperatures. The temperature sensor can be a bipolar-based temperature sensor. However, the bipolar-based temperature sensor can require a larger power supply rail (e.g., about 1 V to about 1.5 V) with smaller power supply variations (e.g., about 1% to about 5%). In contrast, digital circuits of the computer system can have a smaller digital power supply rail (e.g., about 0.5 V to about 0.9 V) with larger power supply variations (e.g., about 8% to about 20%). Thus, bipolar-based temperature sensors can be challenging to integrate into the digital circuits of computer systems.

Additionally, bipolar-based temperature sensors can require more area than other types of devices since, for example, bipolar junction transistor (BJT) devices can occupy more area (e.g., about 10 times more area) than MOS transistors. Further, bipolar-based temperature sensors use a bandgap reference circuit to provide a reference voltage and a proportional to absolute temperature (PTAT) current. The PTAT current has a low temperature sensitivity that is proportional to a log of BJT devices' size ratio. An increase in temperature sensitivity requires an exponential increase in the BJT devices' size. Moreover, the noise on the digital power supply can be at the same frequency as the sampling frequency of the ADC because they operate with the same clock signal of the computer system. As a result, the ADC may not remove all the noise on the temperature signal when converting the temperature signal to the digital representation. With the continuous scaling down of semiconductor devices, bipolar-based temperature sensors become increasingly challenging to integrate into computer systems and the effect of the power supply noise on the temperature sensors need to be reduced to improve the accuracy and precision of the temperature readouts.

Various embodiments in the present disclosure provide a CMOS-based temperature sensor with full band PSR. The CMOS-based temperature sensor can include a CMOS-based reference voltage generator, a CMOS-based temperature front-end circuit, a phase-rotated sigma-delta ADC, and a mapping circuit. The CMOS-based reference voltage generator can use a low voltage digital power supply (e.g., about 0.5 V to about 0.9 V) to generate a reference voltage that is independent of temperature and the digital power supply. In some embodiments, the reference voltage can be generated based on a difference between threshold voltages of two MOS transistors. The CMOS-based temperature front-end circuit can include first and second MOS transistors. The first and second MOS transistors can operate under a substantially constant bias current generated by a current source. The first MOS transistor can include a first terminal electrically coupled to the reference voltage and a second terminal electrically coupled to the second MOS transistor. The second terminal can provide a temperature signal proportional to temperature. In some embodiments, the transistors disclosed herein can be fabricated on the same process node. Implemented with MOS transistors, the temperature sensor can integrate the reference voltage generator and temperature front-end circuit into a single design having a smaller area and higher temperature sensitivity than bipolar-based temperature sensors. Additionally, the substantially constant bias current in the temperature front-end circuit can further improve the power supply rejection ratio (PSRR) and temperature sensitivity of the temperature front-end circuit. As used herein, the PSRR is defined as a ratio of the change in power supply voltage to the equivalent output voltage an electronic circuit produces.

In some embodiments, the phase-rotated sigma-delta ADC can be electrically coupled to the reference voltage and the temperature front-end circuit. The phase-rotated sigma-delta ADC can be configured to convert the temperature signal to a digital representation based on a modulated sampling frequency. The phase-rotated sigma-delta ADC can include a frequency generator configured to generate a modulation frequency having a random variation and to modulate the sampling frequency with the modulation frequency. The modulation frequency can cause a frequency shift of the sampling frequency and filter out the power supply noise around the sampling frequency, thus improving the PSRR of the temperature sensor.

The mapping circuit can map the digital representation of the temperature signal to the temperature readout. In some embodiments, the mapping circuit can include a gain correction function to calibrate the temperature readout with a one-point measurement at room temperature. In some embodiments, calibrating using the one-point measurement without a calibration block can further reduce the area of the temperatures sensor and improve the accuracy of the temperature readout.

FIG. 1 illustrates a computer system 100 that includes a CMOS-based temperature sensor 110 with full band PSR, according to some embodiments. As shown in FIG. 1, computer system 100 can include a processor circuit 102, a memory circuit 104, analog/mixed-signal circuits 106, and an input/output circuit 108, each of which is coupled to a communication bus 112. In some embodiments, computer system 100 can be a SoC. In some embodiments, computer system 100 can be configured for use in a desktop computer, a server, or a mobile computing application, such as a tablet, a laptop computer, and a wearable computing device.

In some embodiments, processor circuit 102 can be representative of a general-purpose processor that performs computational operations. For example, processor circuit 102 can be a CPU, such as a microprocessor, a GPU, an SOC, a microcontroller, an application-specific integrated circuit (ASIC), or a field-programmable gate array (FPGA). It is noted that although a single processor circuit 102 is illustrated in FIG. 1, any suitable number of processors may be employed. During the computational operations of processor circuit 102, processor circuit 102 can generate heat, and the temperature of processor circuit 102 can increase when excessive heat builds up. If the temperature is above a certain threshold (e.g., above about 60° C.), processor circuit 102 may overheat and functional failures may occur.

In some embodiments, memory circuit 104 can include any suitable type of memory, such as a dynamic random-access memory (DRAM), a static random-access memory (SRAM), a read-only memory (ROM), an electrically erasable programmable read-only memory (EEPROM), or a non-volatile memory. It is noted that although a single memory circuit 104 is illustrated in FIG. 1, any suitable number of memory circuits may be employed.

In some embodiments, analog/mixed-signal circuits 106 can include a CMOS-based temperature sensor 110 with full band PSR. CMOS-based temperature sensor 110 can be configured to provide temperature information of computer system 100. For example, CMOS-based temperature sensor 110 can measure the temperature of processor circuit 102 and provide a temperature readout. Based on the temperature readout, processor circuit 102 can reduce or interrupt operations performed by processor circuit 102 to avoid overheating and functional errors. Additionally, processor circuit 102 can adjust the performance of certain electronics, such as memory circuit 104 and input/output circuit 108, based on the temperature information of computer system 100. In some embodiments, CMOS-based temperature sensor 110 can include a CMOS-based reference voltage generator, a CMOS-based temperature front-end circuit, a phase-rotated sigma-delta ADC, and a mapping circuit, which are described in detail below in FIGS. 2 and 3.

In some embodiments, analog/mixed-signal circuits 106 can include additional circuits (not shown), such as a crystal oscillator circuit, a phase-locked loop (PLL) circuit, and a digital-to-analog converter (DAC) circuit. In some embodiments, analog/mixed-signal circuits 106 can be configured to perform power management tasks with the inclusion of on-chip power supplies and voltage regulators.

In some embodiments, input/output circuit 108 can be configured to coordinate data transfer in computer system 100 and between computer system 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuit 108 may be configured to implement a version of universal serial bus (USB) protocol or IEEE 1394 (Firewire®) protocol.

Input/output circuit 108 may also be configured to coordinate data transfer between computer system 100 and one or more devices (e.g., other computing systems or integrated circuits) coupled to computer system 100 via a network. In one embodiment, input/output circuit 108 may be configured to perform the data processing necessary to implement an Ethernet (IEEE 802.3) networking standard such as Gigabit Ethernet or 10-Gigabit Ethernet, although it is contemplated that any suitable networking standard may be implemented.

In some embodiments, input/output circuit 108 may be configured to implement multiple discrete network interface ports.

Figure 2:
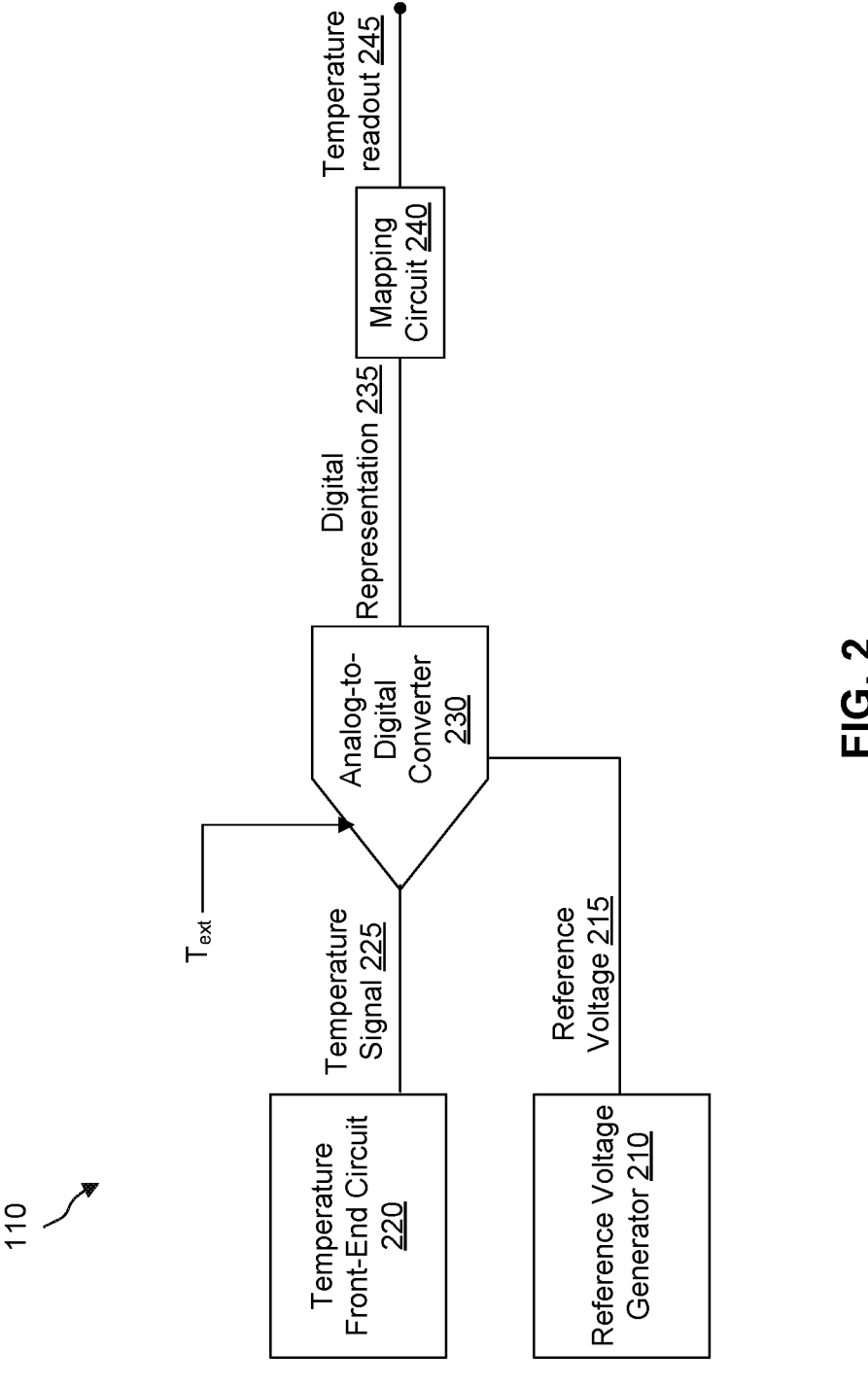
FIG. 2 illustrates a block diagram of a CMOS-based temperature sensor with full band PSR, according to some embodiments.

FIG. 2 illustrates a block diagram of a CMOS-based temperature sensor 110 with full band PSR, according to some embodiments. In some embodiments, CMOS-based temperature sensor 110 can include a CMOS-based reference voltage generator 210, a CMOS-based temperature front-end circuit 220, a phase-rotated sigma-delta ADC 230, and a mapping circuit 240. In some embodiments, CMOS-based reference voltage generator 210 can use a low voltage digital power supply to generate a reference voltage 215 based on a difference between threshold voltages of two MOS transistors. Reference voltage 215 can be independent of temperature and the digital power supply. In some embodiments, CMOS-based temperature front-end circuit 220 can generate a temperature signal 225 proportional to temperature based on two or more MOS transistors. In some embodiments, phase-rotated sigma-delta ADC 230 can be electrically coupled to the reference voltage and can convert temperature signal 225 to a digital representation 235 with a modulated clock signal $T_{ext}$. In some embodiments, mapping circuit 240 can map digital representation 235 for temperature signal 225 to a temperature readout 245. In some embodiments, mapping circuit 240 can include a gain correction function to calibrate temperature readout 245 with a one-point measurement. In some embodiments, the one-point measurement can measure temperature readout 245 at room temperature.

Figure 3:
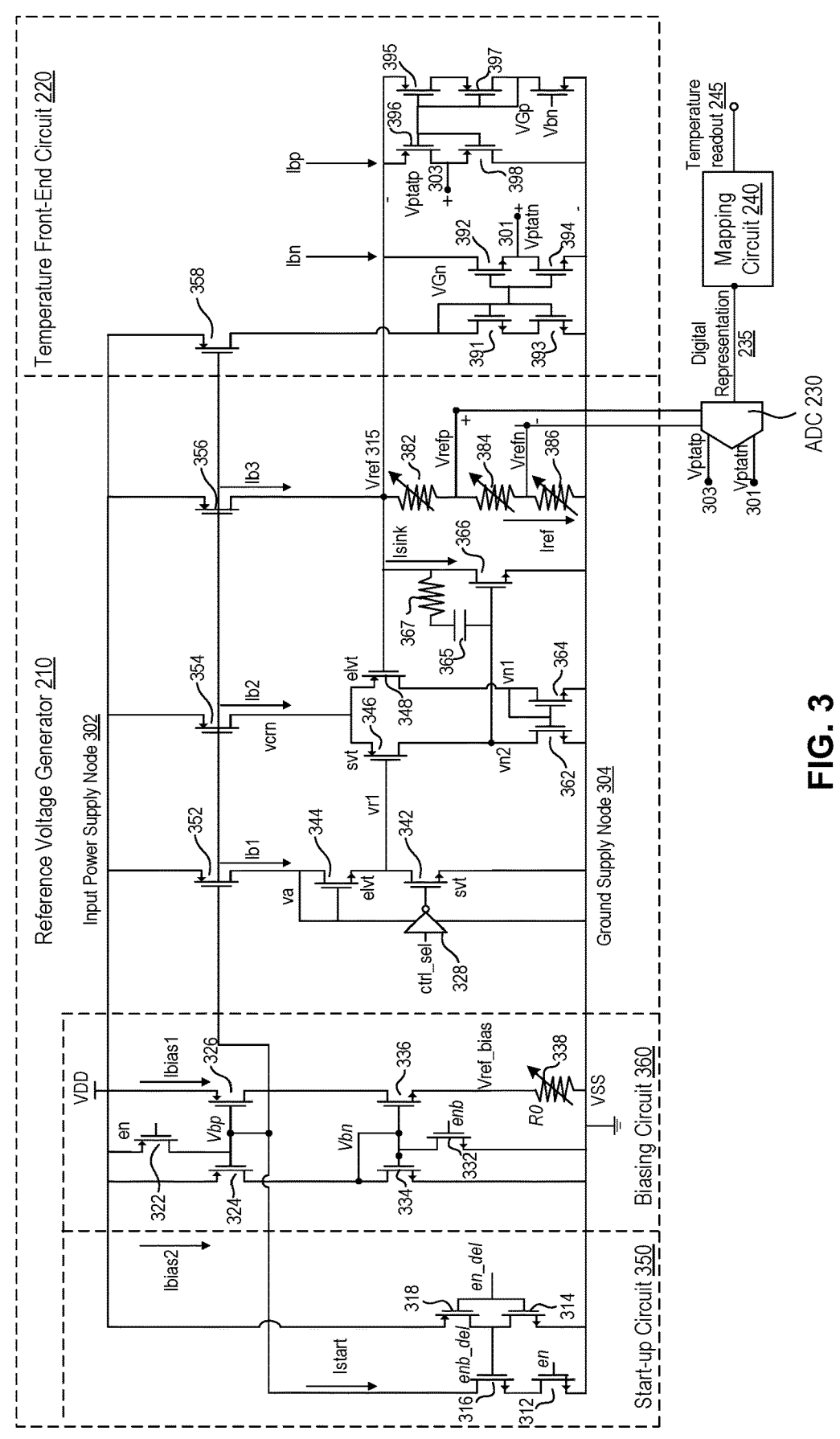
FIG. 3 illustrates a circuit diagram of a CMOS-based temperature sensor with full band PSR, according to some embodiments.

FIG. 3 illustrates a circuit diagram of a CMOS-based temperature sensor 110 with full band PSR, according to some embodiments. As shown in FIG. 3, CMOS-based temperature sensor 110 can be electrically coupled to input power supply node 302 and ground supply node 304. In some embodiments, input power supply node 302 can be electrically connected to a low voltage digital power supply (e.g., about 0.5 V to about 0.9 V), also referred to as "VDD." Ground supply node 304 can be electrically connected to a ground level (e.g., 0 V), also referred to as "VSS."

In some embodiments, as shown in FIG. 3, CMOS-based temperature sensor 110 can include CMOS-based reference voltage generator 210, CMOS-based temperature front-end circuit 220, phase-rotated sigma-delta ADC 230, and mapping circuit 240. Reference voltage generator 210 can include a start-up circuit 350 to generate a start-up current for temperature sensor 110. In some embodiments, start-up circuit 350 can include devices 312, 314, 316, and 318. Devices 312, 314, 316, and 318 can be implemented with MOS transistors. In some embodiments, MOS transistors can also be referred to as "field-effect transistors" (FETs). As used and described herein, a MOS transistor or a FET is a type of transistor that uses an electric field to control the flow of current in an integrated circuit. Various types of technologies can be used to fabricate a MOS transistor. In some embodiments, MOS transistors can include metal-oxide semiconductor field-effect transistors ("MOSFETs"), fin field-effect transistors ("FinFETs"), gate-all-around field-effect transistors ("GAAFETs"), and the like.

In some embodiments, a MOS transistor can have three terminals denoted as "source," "gate," and "drain." In response to an application of a voltage to the gate terminal, the MOS transistor alters the conductivity between the drain and source terminals, thereby changing the flow of current between the two terminals. The voltage applied to the gate terminal needs to exceed a particular value (referred to as a "threshold voltage") to allow the current flowing between the drain and source terminals. The current between the drain and source terminals generally increases in response to an increase in the voltage level applied to the gate. Depending on a type of majority carrier (e.g., n-type or p-type) that conducts current between the source and drain terminals, the polarity of voltage level applied to the gate terminal may be different relative to the threshold voltage.

In some embodiments, devices 312, 314, and 316 can be implemented with n-type MOS transistors, such as n-type MOSFETs, FinFETs, GAAFETs, and any other suitable devices. In some embodiments, device 318 can be implemented with p-type MOS transistors, such as p-type MOS-FETs, FinFETs, GAAFETs, and any other suitable devices. In some embodiments, as shown in FIG. 3, device 312 can be controlled by an enable signal (referred to as "en") and devices 314 and 318 can be controlled by an enable delay signal (referred to as "en_del"). Device 312 can be configured to, in response to an activation of the enable signal, couple device 316 to ground supply node 304, allowing a start-up current "Istart" to flow through device 316. Devices 314 and 318 can be connected together to form an inverter and can be configured to generate a complementary enable delay signal (referred to as "enb_del") controlling device 316. In some embodiments, the enable signal and enable delay signal can control start-up circuit 350 to generate the start-up current "Istart." In some embodiments, the enable delay signal can be generated from the enable signal as shown in FIGS. 4 and 5.

Figure 4:
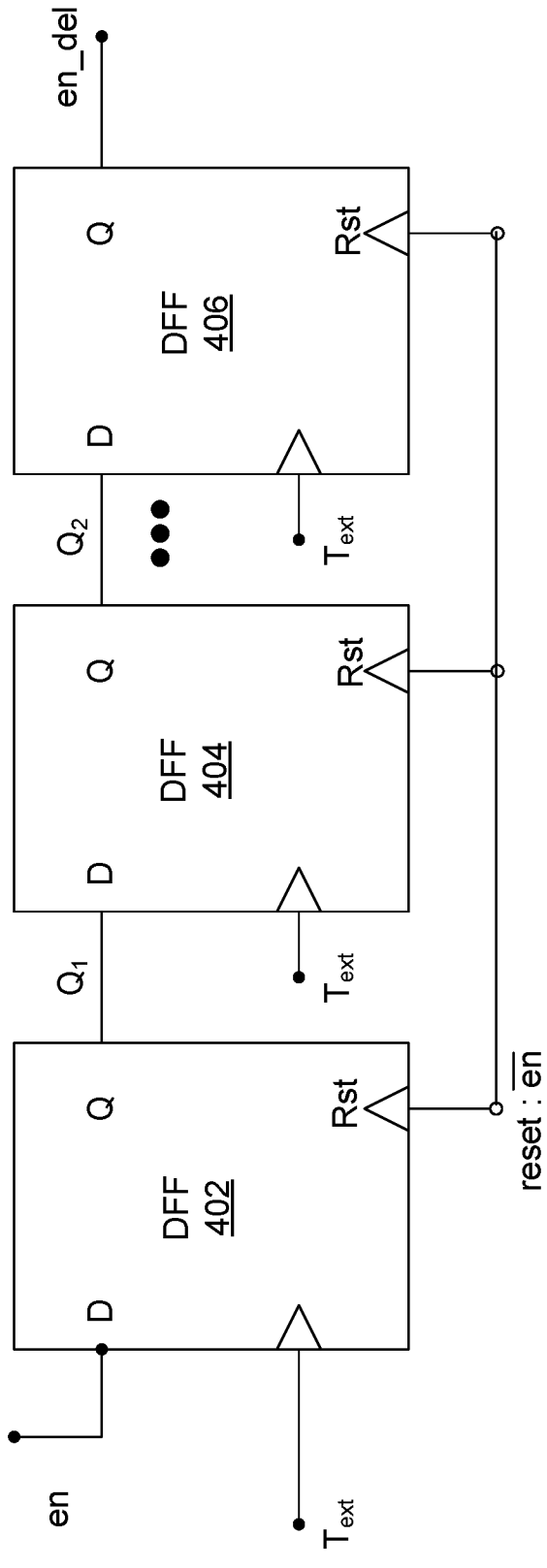
FIG. 4 illustrates a block diagram of generating an enable delay signal, according to some embodiments.
Figure 5:
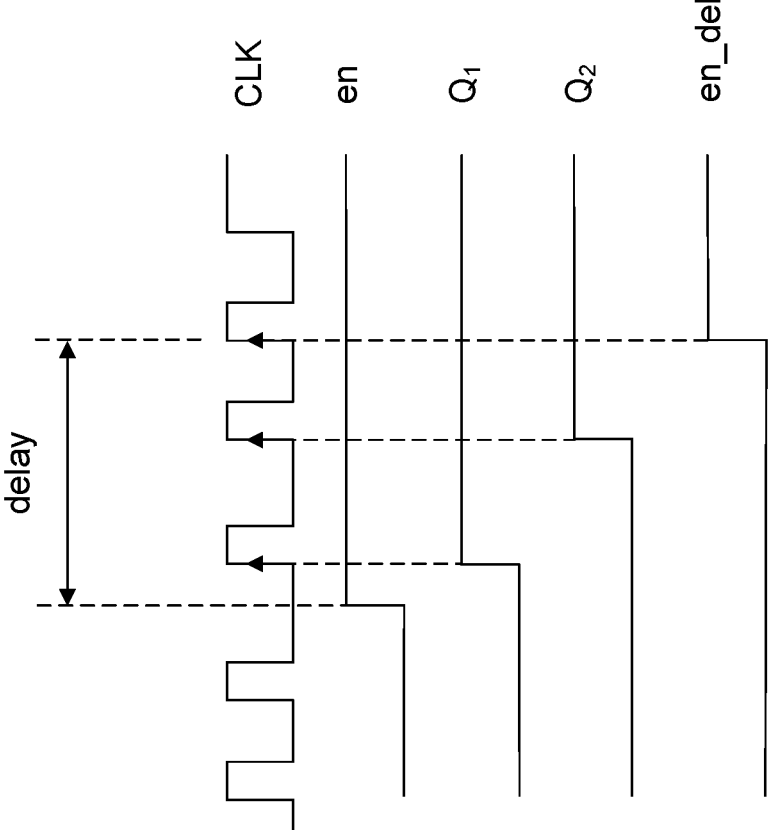
FIG. 5 illustrates a timing chart of generating an enable delay signal, according to some embodiments.

FIG. 4 illustrates a block diagram of generating an enable delay signal "en_del," according to some embodiments. The enable delay signal "en_del" can be generated with one or more data flip-flops (DFFs) connected in series, such as DFF 402, DFF 404, and DFF 406 shown in FIG. 4. FIG. 5 illustrates a timing chart of generating the enable delay signal "en_del" shown in FIG. 4, according to some embodiments. A clock signal $T_{ext}$ can be connected to the timing control port CLK of DFFs 402-406. In some embodiments, the clock signal $T_{ext}$ can be an external clock signal outside of CMOS-based temperature sensor 110. In some embodiments, the clock signal $T_{ext}$ can be a system clock signal for computer system 100. The enable signal "en" can be connected to data input port D of DFF 402. Data Q1 can be passed from data output port Q of DFF 402 to data input port D of DFF 404. Similarly, data Q2 can be passed from data output port Q of DFF 404 to data input port D of DFF 406. A complementary enable signal "en bar" can be connected to the reset port RST of DFFs 402-406. As shown in FIG. 5, the enable delay signal "en_del" generated by DFFs 402-406 can have a delay from the enable signal "en." Start-up circuit 350 can generate the start-up current Istart during the delay period and can shut off after the delay period when the enable delay signal "en_del" becomes logic high. In some embodiments, based on the circuit design of temperature sensor 110, the delay period can include about 1 to about 10 clock cycles of the clock signal. In some embodiments, the delay period can range from 40 ns to about 80 ns. In some embodiments, with the enable signal and enable-delay signal controlling start-up circuit 350, device area can be reduced for temperature sensor 110.

Referring to FIG. 3, reference voltage generator 210 can include a supply independent biasing circuit 360 to generate a substantially constant bias current independent of the power supply. Supply independent biasing circuit 360 can improve PSRR of temperature sensor 110. In some embodiments, as shown in FIG. 3, supply independent biasing circuit 360 can include resistor 338 and devices 322, 324, 326, 332, 334, and 336. In some embodiments, devices 322, 324, and 326 can be implemented with p-type MOS transistors, such as p-type MOSFETs, FinFETs, GAAFETs, and any other suitable devices. Devices 332, 334, and 336 can be implemented with n-type MOS transistors, such as n-type MOSFETs, FinFETs, GAAFETs, and any other suitable devices. As shown in FIG. 3, gate terminals for devices 324 and 326 can be connected to form a current mirror circuit, and gate terminals for devices 334 and 336 can be connected to form another current mirror circuit. As a result, a substantially constant bias current Ibias1 flowing through devices 326 and 336 can be the same as substantially constant bias current Ibias2 flowing through devices 324 and 334. Substantially constant bias currents Ibias1 and Ibias2 can be independent of the power supply on input power supply node 302. In some embodiments, the substantially constant bias currents Ibias1 and Ibias2 generated by supply independent biasing circuit 360 can be adjusted by resistor 338. In some embodiments, devices 322 and 332 can be controlled respectively by the enable signal "en" and a complementary enable signal "enb" to start supply independent biasing circuit 360.

In some embodiments, supply independent biasing circuit 360 can provide substantially constant bias currents for reference voltage generator 210 and temperature front-end circuit 220. For example, as shown in FIG. 3, gate terminals of devices 326, 352, 354, 356, and 358 can be electrically connected and biased at the same voltage Vbp. The gate terminals of devices 336 and 399 can be electrically connected and biased at the same voltage Vbn. Accordingly, devices 352, 354, 356, 358, and 399 can form current mirror circuits to provide substantially constant bias currents Ib1, Ib2, Ib3, Ibn, and Ibp. In some embodiments, the sizes of devices 352, 354, 356, and 358 can be matched to device 326 and the size of device 399 can be matched to device 336 to generate substantially the same constant bias current flowing through each device. In some embodiments, devices 352, 354, 356, and 358 can be implemented with p-type MOS transistors, such as p-type MOSFETs, FinFETs, GAAFETs, and any other suitable devices. In some embodiments, device 399 can be implemented with n-type MOS transistors, such as n-type MOSFETs, FinFETs, GAAFETs, and any other suitable devices.

Referring to FIG. 3, reference voltage generator 210 can further include a control selector 328, a capacitor 365, resistors 367, 382, 384, and 386, and devices 342, 344, 346, 348, 362, 364, and 366. In some embodiments, control selector 328 can select device 342 out of a number of MOS transistors to adjust a temperature response of device 342, in case device 342 has a systematic temperature drift due to process variations. In some embodiments, control selector 328 can select device 342 with a specific W/L size ratio to adjust the temperature response of device 342. In some embodiments, capacitor 365 and resistor 367 can form a Miller compensation circuit to stabilize reference voltage Vref 315. In some embodiments, devices 342, 344, 362, 364, and 366 can be implemented with n-type MOS transistors, such as n-type MOSFETs, FinFETs, GAAFETs, and any other suitable devices. In some embodiments, devices 344, 346, and 348 can be implemented with p-type MOS transistors, such as p-type MOSFETs, FinFETs, GAAFETs, and any other suitable devices.

In some embodiments, the threshold voltages of devices 342 and 344 can be different. For example, device 344 can be implemented with an extreme low-threshold (elvt) device (e.g., Vth from about 0.1 V to about 0.5 V), while device 342 can be implemented with a standard-threshold (svt) device (e.g., Vth from about 0.6 V to about 1.0 V). Since devices 342 and 344 are coupled together in series and there is negligible current into gate terminals of device 346, devices 342 and 344 can both operate under the same substantially constant bias current Ib1. Accordingly, the output voltage Vr1 of devices 342 and 344 can be a difference between the gate-to-source voltages of devices 342 and 344 and can be further calculated as a difference between threshold voltages Vth (342) and Vth (344) of devices 342 and 344, as shown in equation (1).

$$Vr1 = Vth(342) - Vth(344) \tag{1}$$

Similarly, device 348 can be implemented with an elvt device and device 346 can be implemented with a svt device. Since devices 346 and 348 are connected to a current mirror circuit formed by devices 362 and 364, devices 346 and 348 can operate under the same substantially constant bias current, about a half of Ib2. Accordingly, the output voltage Vref 315 of device 348 can be voltage Vr1 plus a difference between threshold voltages Vth (346) and Vth (348) of devices 346 and 348, as calculated in equation (2).

$$Vref = Vth(342) - Vth(344) + Vth(346) - Vth(348) \tag{2}$$

Referring to FIG. 3, reference voltage generator 210 can further include device 356, device 366, and resistors 382, 384, and 386. In some embodiments, resistors 382, 384, and 386 can be arranged as shown in FIG. 3 to divide reference voltage Vref 315 and generate differential reference voltages Vrefp and Vrefn for ADC 230. In some embodiments, resistances of resistors 382, 384, and 386 can be adjusted to tune reference voltages Vrefp and Vrefn. As described above, reference voltage Vref 315 is generated based on the threshold voltages of devices 342, 344, 346, and 348, which may not change with temperature. And resistances of resistors 382, 384, and 386 may not change with temperature. When temperature increases or decreases, the respective values of reference voltages Vref 315, Vrefn, and Vrefp can remain the substantially the same. As a result, reference voltages Vref 315, Vrefn, and Vrefp can be independent of temperature. Though FIG. 3 illustrates that both differential reference voltages Vrefp and Vrefn are electrically coupled to ADC 230, ADC 230 can be electrically coupled to a single reference voltage of Vrefn, Vrefp, or Vref 315. In some embodiments, reference voltage 215 in FIG. 2 can be one of Vrefn, Vrefp, or Vref 315 or a pair of differential reference voltages Vrefp and Vrefn in FIG. 3.

Referring to FIG. 3, temperature front-end circuit 220 can generate temperature signal Vptatn proportional to absolute temperature at node 301 and temperature signal Vptatp proportional to absolute temperature at node 303. In some embodiments, temperature front-end circuit 220 can include devices 358 and 391-399. In some embodiments, devices 391-394 and 399 can be implemented with n-type MOS transistors, such as n-type MOSFETs, FinFETs, GAAFETs, and any other suitable devices. In some embodiments, devices 358 and 395-398 can be implemented with p-type MOS transistors, such as p-type MOSFETs, FinFETs, GAAFETs, and any other suitable devices.

In some embodiments, as shown in FIG. 3, devices 358, 391, and 393 can be coupled together in series. Since there is negligible current into gate terminals of devices 392 and 394, devices 358, 391, and 393 can operate under the same substantially constant bias current. As shown in FIG. 3, gate terminals of devices 391-394 can be electrically connected and biased at the same voltage VGn. Accordingly, devices 391 and 393 can form a current mirror circuit to provide substantially constant bias currents Ibn for devices 392 and 394. Similarly, gate terminals of devices 395-398 can be electrically connected and biased at the same voltage VGp and devices 395 and 397 form another current mirror circuit to provide substantially constant bias currents Ibp for devices 392 and 394.

Referring to FIG. 3, devices 392 and 394 can be coupled together in series to generate temperature signal Vptatn proportional to the absolute temperature. As shown in FIG. 3, device 392 can have a first terminal electrically coupled to reference voltage Vref 315 and a second terminal electrically coupled to device 394 at node 301. The second terminal at node 301 can provide the temperature signal Vptatn. In some embodiments, the temperature signal Vptatn can be the difference between the gate-to-source voltages of devices 392 and 394. Since both devices 392 and 394 are coupled together in series and there is negligible current into any load circuits connected to node 301, devices 392 and 394 can operate in the subthreshold region under the same substantially constant bias current Ibn. Accordingly, temperature signal Vptatn can be calculated as a voltage difference between node 301 and ground supply node 304 shown in equation (3), where Vth (394) is the threshold voltage for device 394, Vth (392) is the threshold voltage for device 392, $u_1W_1/L_1$ is the respective device property of device 394, and $u_2W_2/L_2$ is the respective device property of device 392.

$$Vptatn = Vth(394) - Vth(392) + nV_T[(u_1W_1/L_1)/(u_2W_2/L_2)] \tag{3}$$

Since the difference between the threshold voltages of devices 512 and 514 may not change with temperature, according to equation (3), temperature signal Vptatn can be proportional to thermal voltage $V_T$, which is kT/q, and thus proportional to the absolute temperature T. As a result, temperature signal Vptatn can be proportional to the absolute temperature T. In some embodiments, as shown in equation (3), temperature signal Vptatn can be independent of the power supply at input power supply node 302.

Similarly, devices 396 and 398 can be coupled together in series to generate temperature signal Vptatp proportional to the absolute temperature T. As shown in FIG. 3, device 396 can have a first terminal electrically coupled to reference voltage Vref 315 and a second terminal electrically coupled to device 398 at node 303. The second terminal at node 303 can provide the temperature signal Vptatp. Devices 396 and 398 can be coupled together in series and can operate in the subthreshold region under the same substantially constant bias current Ibp. Accordingly, temperature signal Vptatp can be calculated as a voltage difference between Vref 315 and node 303 shown in equation (4), where Vth (396) is the threshold voltage for device 396, Vth (398) is the threshold voltage for device 398, $u_3W_3/L_3$ is the respective device property of device 396, and $u_4W_4/L_4$ is the respective device property of device 398.

$$Vptatp = Vth(396) - Vth(398) + nV_T[(u_3W_3/L_3)/(u_4W_4/L_4)] \tag{4}$$

In some embodiments, as shown in FIG. 3, devices 391-398 of temperature front-end circuit 220 can be outside of the feedback loop of reference voltage generator 210 and can operate under substantially constant bias currents. As a result, the PSRR of temperature sensor 110 can be improved by orders of magnitude. For example, temperature front-end circuit 220 in FIG. 3 can improve the PSRR of temperature sensor 110 by about 10 dB to about 20 dB. Additionally, decoupling temperature front-end circuit 220 from the feedback loop of reference voltage generator 210 can increase design flexibility. The substantially constant bias currents Ibn and Ibp and the loop bandwidth of reference voltage generator 210 can be designed independently to optimize the performance of temperature sensor 110.

Referring to FIG. 3, ADC 230 can be electrically coupled to the reference voltages Vrefp and Vrefn and temperature front-end circuit 220. ADC 230 can convert the temperature signals Vptatp and Vptatn to digital representation 235 of the temperature signals. Though FIG. 3 illustrates ADC 230 is electrically coupled to differential reference voltages Vrefn and Vrefp and differential temperature signals Vptatn and Vptatp, ADC 230 can be electrically coupled to a single reference voltage (e.g., Vrefn, Vrefp, or Vref) and/or a single temperature signal (e.g., Vptatn or Vptatp).

Figure 6:
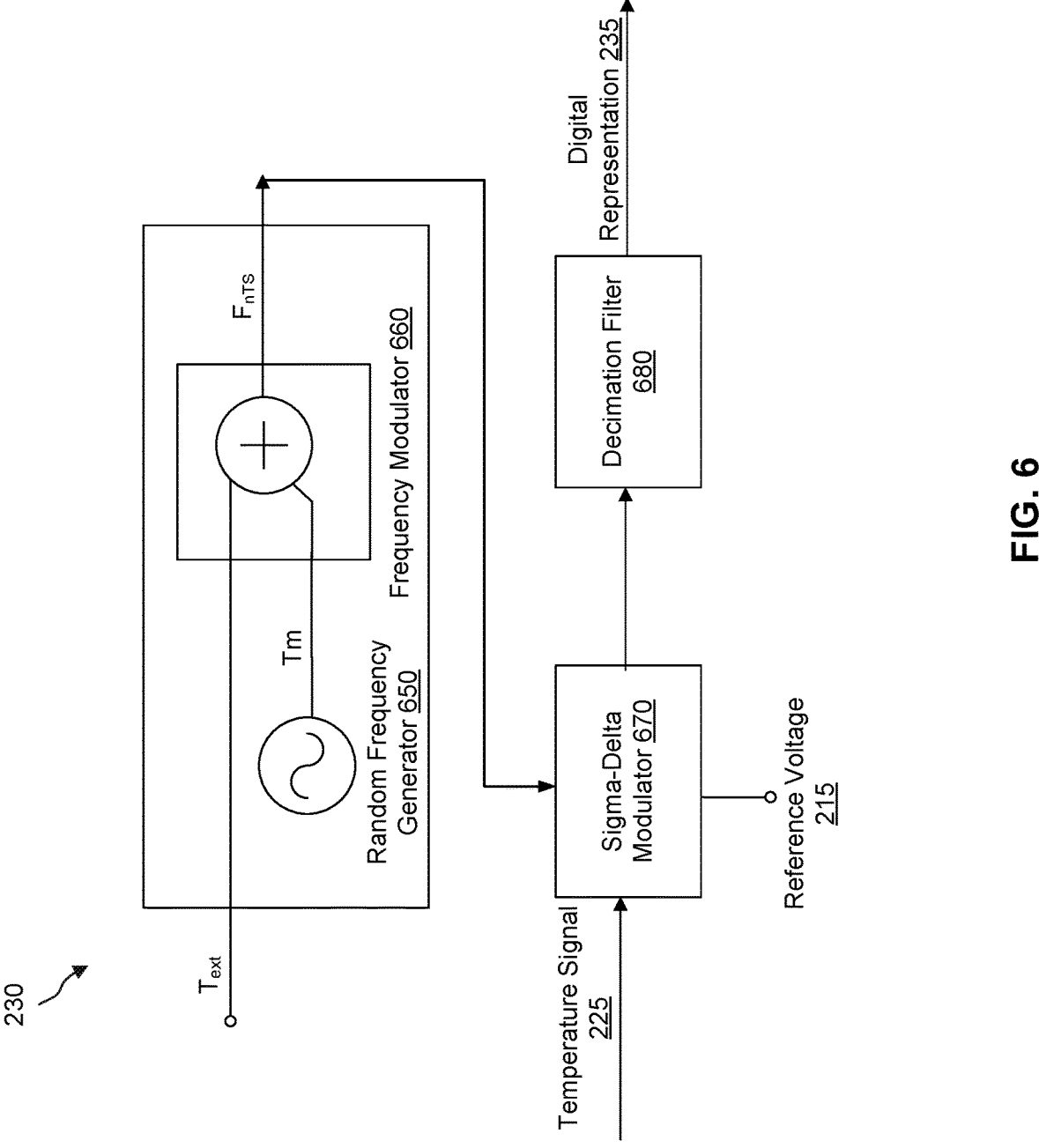
FIG. 6 illustrates a block diagram of an analog-to-digital converter including a frequency generator, according to some embodiments.

In some embodiments, ADC 230 can be a sigma-delta ADC and can sample the temperature signals Vptatn and Vptatp with a sampling frequency modulated by a modulation frequency having a random variation. FIG. 6 illustrates a block diagram of a phase-rotated sigma-delta ADC 230 including a frequency generator 650, according to some embodiments. In some embodiments, frequency generator 650 can be a free running ring oscillator formed by a number of inverters, for example about 3 or 5 inverters. In some embodiments, the frequency of the free running ring oscillator can be divided down by one or more flip-flops to generate the modulation signal Tm. In some embodiments, the modulation signal Tm of frequency generator 650 can vary in a random manner as T+T', where T is an average period of the modulation signal Tm and T is a random value. In some embodiments, the variations of the modulation signal Tm can be caused by local temperature effects and the variations can result in the modulation signal Tm to be above or below the average period T by the random value T'. In some embodiments, random value T' can be relatively small compared to average period T and the random variation of the modulation signal Tm of frequency generator 650 can be referred to as "clock jitter."

As shown in FIG. 6, ADC 230 can further include a frequency modulator 660, a sigma-delta modulator 670, and a decimation filter 680. In some embodiments, frequency modulator 660 can generate a modulated sampling frequency $F_{nTS}$ based on the clock signal $T_{ext}$ and the modulation signal Tm. Sigma-delta modulator 670 can sample temperature signal 225 with the modulated sampling frequency $F_{nTS}$. Decimation filter 680 can accumulate and average each sampled signal and convert the sampled signal into digital representation 235. In some embodiments, clock signal $T_{ext}$ can be an accurate external clock signal, such as a system clock signal for computer system 100. Frequency modulator 660 can modulate the clock signal $T_{ext}$ with the modulation signal Tm to generate the modulated sampling frequency $F_{nTS}$ according to equation (5), where n is an integer.

$$1/F_{nTS} = T_{nTS} = T_{ext} + n*Tm = T_{ext} + n*(T+T') \quad (5)$$

In some embodiments, frequency modulator 660 can add the modulation signal Tm to the clock signal $T_{ext}$ to modulate or randomize clock signal $T_{ext}$. Accordingly, the modulated sampling signal $T_{nTS}$ can have a random phase rotation of n*Tm, for which ADC 230 can be referred to as a "phase-rotated sigma-delta ADC." Modulated Sampling frequency $F_{nTS}$ can shift from the external clock frequency Fest, which equals to $1/T_{ext}$, by a random frequency shift. The random frequency shift and the phase rotation can be illustrated in FIGS. 7A-7B and 8A-8B.

Figure 7A:
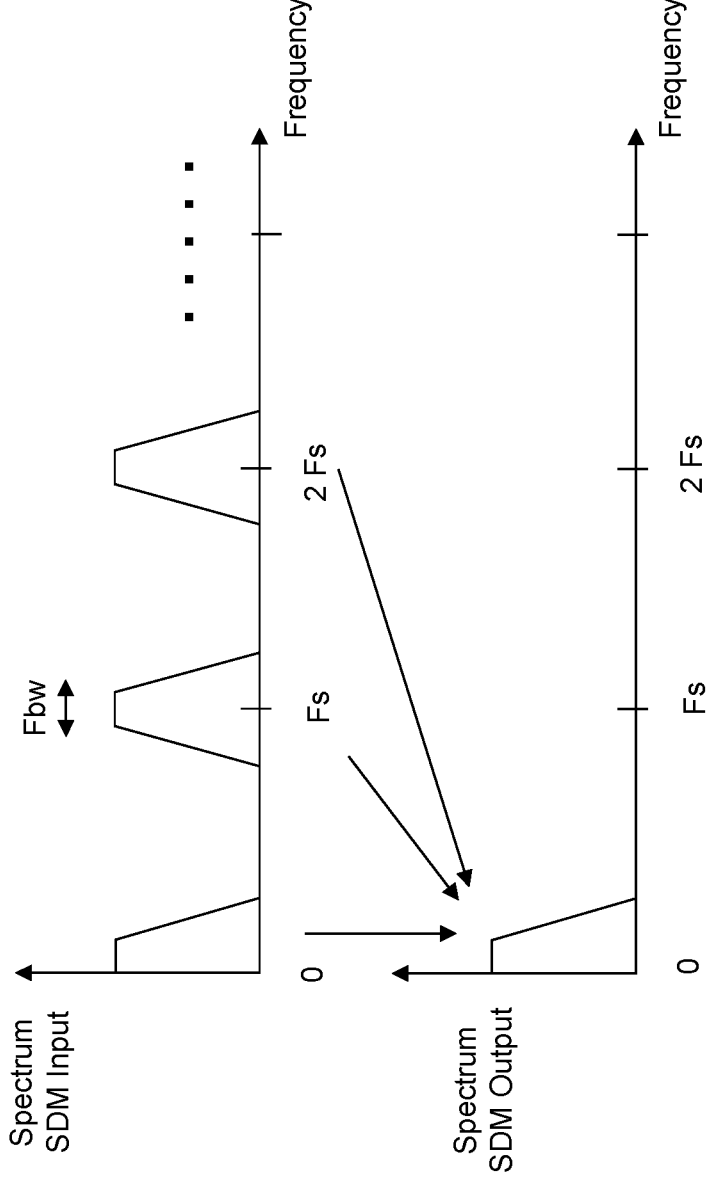
FIGS. 7A and 7B illustrate frequency and timing charts of sampling a temperature signal with a sampling frequency, according to some embodiments.
Figure 7B:
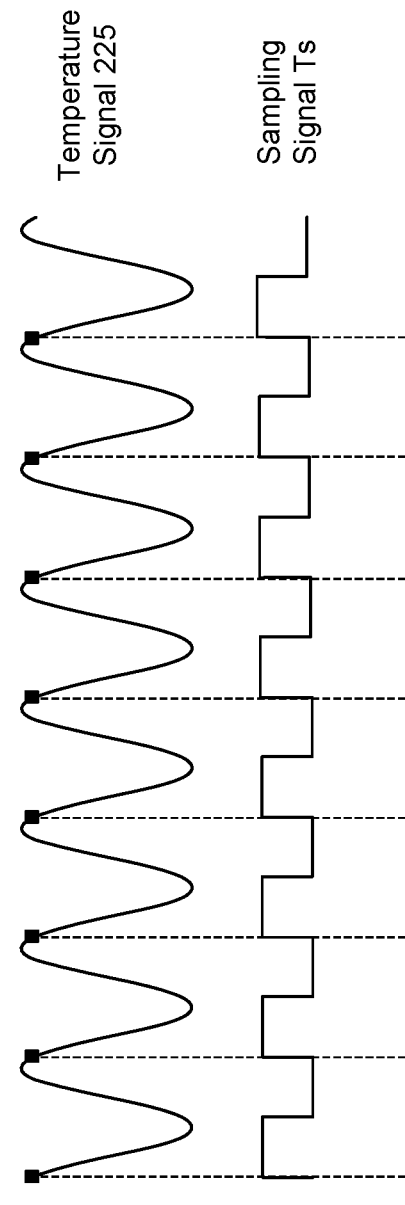

FIGS. 7A and 7B illustrate frequency and timing charts of sampling a temperature signal with a sampling frequency, according to some embodiments. In some embodiments, as shown in FIG. 6, sigma-delta modulator 670 can be electrically coupled to reference voltage 215 and configured to convert temperature signal 225 into digital representation 235. Referring to FIG. 7A, the spectrum at the input of sigma-delta modulator 670 can be shown in the top plot and the spectrum at the output of sigma-delta modulator 670 can be shown in the bottom plot. In some embodiments, sigma-delta modulator 670 can sample temperature signal 225 with a sampling frequency $Fs \pm F_{BW}$, where $F_{BW}$ is the bandwidth of the sampling frequency and can be set by an oversampling rate of ADC 230. For example, sample frequency Fs can be about 24 MHz and bandwidth $F_{BW}$ can be about 3 kHz. Sigma-delta modulator 670 can alias the sampled temperature signal 225 at multiples of sampling frequency $n*Fs \pm F_{BW}$ back to the DC component, as shown in the bottom plot of FIG. 7A. In some embodiments, the top and bottom plots in FIG. 7B can illustrate sampling temperature signal 225 with a sampling signal Ts, which equals to 1/Fs, and aliasing the sampled temperature signal 225 back to the DC component. In some embodiments, sigma-delta modulator 670 can filter the power supply noise outside of the multiples of sampling frequency $n*Fs \pm F_{BW}$. However, since the digital power supply VDD and temperature sensor may operate under the same system clock signal $T_{ext}$, the power supply noise and temperature signal 225 can be sampled around the same frequency $F_{ext}$. As a result, sigma-delta modulator 670 may alias the power supply noise at multiples of the sampling frequency $n*Fs \pm F_{BW}$ back to the DC component. Though the bandwidth $F_{BW}$ and power supply noise can be reduced by increasing the oversampling rate, the conversion of temperature signal 225 to digital representation 235 may take additional time.

Figure 8A:
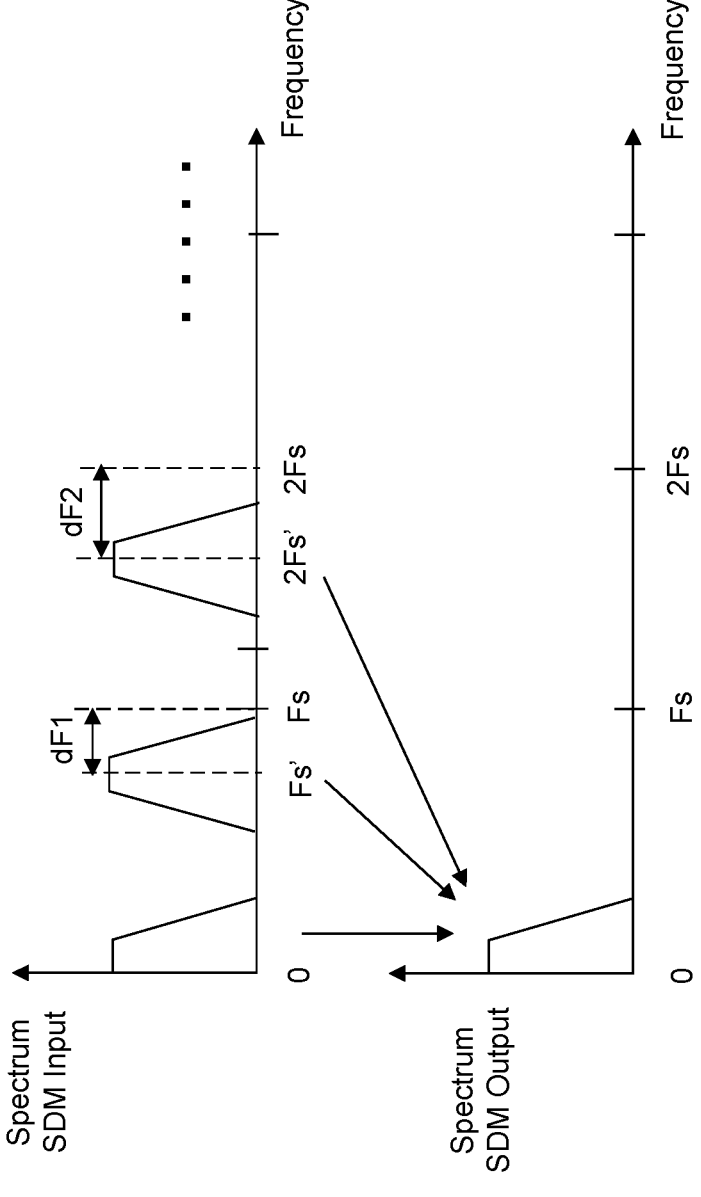
FIGS. 8A and 8B illustrate frequency and timing charts of sampling a temperature signal with a modulated sampling frequency having a random frequency shift, according to some embodiments.
Figure 8B:
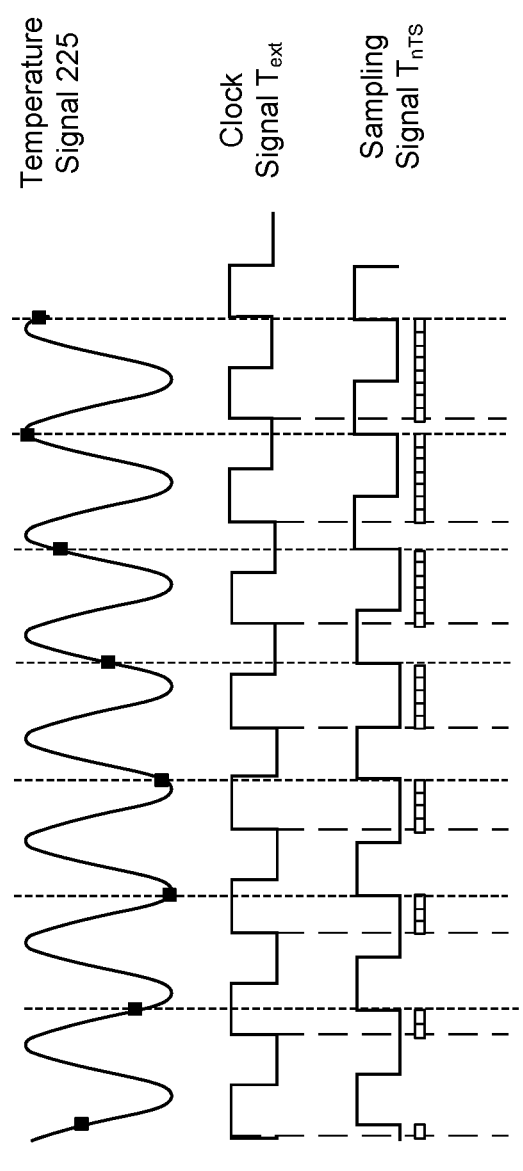

FIGS. 8A and 8B illustrate frequency and timing charts of sampling a temperature signal with a modulated sampling frequency having a random frequency shift, according to some embodiments. Referring to FIG. 8A, the spectrum at the input of sigma-delta modulator 670 can be shown in the top plot and the spectrum at the output of sigma-delta modulator 670 can be shown in the bottom plot. Modulated by modulation frequency Fm, the modulated sampling frequency Fs' can be $F_{nTS}$, which equals to $1/(T_{ext}+n*Tm)$. As shown in FIG. 8A, the multiples of modulated sampling frequency n*Fs' can shift from the multiples of sampling frequency n*Fs by a random frequency shift, for example dF1 and dF2. The random frequency shift of the modulated sampling frequency n*Fs' can filter out the power supply noise around the sampling frequency n*Fs. Referring to FIG. 8B, the random frequency shift shown in FIG. 8A can be illustrated as a random delay to each sampling edge of the clock signal $T_{ext}$. The modulated sampling signal $T_{nTS}$ can sample temperature signal 225 with a random phase rotation. In some embodiments, decimation filter 680 shown in FIG. 6 can accumulate and average each sampled signal and convert the sampled signal into digital representation 235.

With the random frequency shift, the average frequency of the modulated sample frequency $F_{nTS}$ can stay close to $F_{nTS}$ and decimation filter 680 can remove the power supply noise after averaging each sampled signal.

In some embodiments, ADC 230 can have a sampling frequency Fs around 24 MHz and a period of clock signal $T_{ext}$ can be about 41.7 ns. Frequency generator 650 can generate a modulation frequency Fm around 1 GHz. The modulation period Tm can be around 1 ns. Accordingly, the modulated sampling signal $T_{nTS}$ can have a period about 42.7 ns according to equation (5). The modulated sampling frequency $F_{nTS}$ or Fs' can be around 23.4 MHz. The frequency shift dF1 between the modulated sampling frequency Fs' and the sampling frequency can be about 600 kHz, greater than the bandwidth $F_{BW}$ of 3 kHz. As a result, the frequency shift dF1 can filter out the power supply noise in bandwidth $F_{BW}$ of the sampling frequency Fs. Similarly, the frequency shift at the multiples of the modulated sampling frequency $F_{nTS}$ can filter out the power supply noise around the multiples of the sampling frequency Fs, for which temperature sensor 110 can be referred to as a temperature sensor "with full band PSR." Additionally, the random variation of the modulation frequency Fm can lead to a random frequency shift of the modulated sampling frequency Fs' and thus further reduce the power supply noise and improve PSRR of temperature sensor 110.

Referring to FIG. 3, mapping circuit 240 can map digital representation 235 to temperature readout 245. In some embodiments, temperature sensor 110 can be calibrated to improve temperature measurement accuracy between about −40° C. and about 125° C. In some embodiments, temperature signal 225 and digital representation 235 of temperature sensor 110 can be defined in equations (6)-(8), where $V_{TFE}(T)$ and $V_{PTAT}(T)$ can represent temperature signal 225 generated by temperature front-end circuit 220 at a temperature T, Vref(T) can represent the reference voltage electrically coupled to ADC 230, and D (T) can represent digital representation 235 generated by ADC 230, $$V_{TFE}(T) = V_{PTAT}(T) = c + d * (T - 25) \tag{6}$$

$$V_{ref}(T) = a + b * (T - 25) \tag{7}$$

$$D(T) = \frac{V_{TFE}(T)}{V_{ref}(T)} = \frac{c + d * (T - 25)}{a + b * (T - 25)} \tag{8}$$

In equations (6)-(8), parameter "a" can be defined as Vref at a room temperature of about 25° C. and parameter "c" can be defined as $V_{TFE}$ at a room temperature of about 25° C. Parameter "b" can represent a temperature slope of Vref and parameter "d" can represent a temperature slope of $V_{TFE}$. In some embodiments, since Vref can be independent of temperature, parameter "b" can be negligible. And since $V_{TFE}$ can be proportional to absolute temperature, parameter "d" can be substantially constant. Parameters "a" and "c" can vary with manufacturing process variations. In some embodiments, a calibration block, such as a resistor divider, can be used in reference voltage generator 210 to calibrate the parameter "a" and adjust the generated reference voltage Vref. However, the calibration block may have a larger area and the calibration process may take more effort.

In some embodiments, mapping circuit 240 can include a gain correction function to calibrate temperature sensor 110 with a one-point calibration process. In some embodiments, the one-point calibration process can have one-point measurement of digital representation 235 at a room temperature of about 25° C. In some embodiments, the one-point calibration process can be described by equations (9)-(12) and method 900 in FIG. 9. Since parameter "b" is negligible, equation (8) can be simplified to equation (9).

$$D(T) = \frac{V_{TFE}(T)}{V_{ref}(T)} = \frac{c + d * (T - 25)}{a} \tag{9}$$

$$D'(T) = \frac{c + d * (T - 25)}{k} \tag{10}$$

$$D'(25) = \frac{c}{k} \tag{11}$$

$$D_{eff}'(T) = D'(T) - D'(25) = \frac{d * (T - 25)}{k} \tag{12}$$

FIG. 9 illustrates a method 900 for calibrating CMOS-based temperature sensor 110 with a one-point calibration process, according to some embodiments. For illustrative purposes, the operations illustrated in method 900 will be described with reference to equations (6)-(12) and FIGS. 2 and 3. Additional operations may be performed between various operations of method 900 and may be omitted merely for clarity and ease of description. Additional operations can be provided before, during, and/or after method 900; one or more of these additional operations are briefly described herein. Moreover, not all operations may be needed to perform the disclosure provided herein. Additionally, some of the operations may be performed simultaneously or in a different order than shown in FIG. 9. In some embodiments, one or more other operations may be performed in addition to or in place of the presently described operations.

Referring to FIG. 9, method 900 begins with operation 910 to measure a reference voltage at room temperature. For example, as shown in FIGS. 2 and 3, reference voltage generator 210 can generate reference voltage Vref 315. Due to process variations, device properties can have changes from one integrated circuit to another. Accordingly, Vref 315 of one temperature sensor 110 may be different from another one. In some embodiments, the reference voltage Vref 315 can be measured at a room temperature of about 25° C. For example, Vref (T) can be about 0.5 V at a room temperature of about 25° C. As parameter "b" is negligible, parameter "a" can be about 0.5 V at a room temperature of about 25° C. In some embodiments, left and right sides of equations (9) can be multiplied by a/k to obtain equation (10), where k can be a constant, such as 1 or 5.

Referring to FIG. 9, in operation 920, a first digital representation for a first temperature signal at room temperature is generated. For example, as shown in FIGS. 2 and 3, first digital representation 235 can be generated for a first temperature signal 225 at a room temperature of about 25° C. Using equation (10), first digital representation 235 at a room temperature of about 25° C. can be calculated as c/k, as shown in equation (11). In some embodiments, mapping circuit 240 can map the first digital representation 235 to temperature readout 245 of about 25° C. using a look-up table. In some embodiments, the digital representation measurement at room temperature can be referred to as "one-point measurement."

Referring to FIG. 9, in operation 930, a second digital representation of a second temperature signal is calibrated with the measured reference voltage and the generated first digital representation at room temperature. For example, as shown in equation (12), a calibrated effective digital representation $D_{eff}'(T)$ can be calculated as a difference between the digital representation D'(T) at a temperature T and the digital representation D'(25) at a room temperature of about 25° C. As parameters "d" and "k" can be constant, the calibrated effective digital representation $D_{eff}'(T)$ can have a linear relationship with the temperature T. In some embodiments, the calibration of the digital representation of a temperature signal with the reference voltage and digital representation measured at room temperature can be referred to as "one-point calibration" or "gain correction function."

Referring to FIG. 9, in operation 940, the calibrated second digital representation is mapped to a temperature readout for the second temperature signal. For example, as shown in FIGS. 2 and 3, mapping circuit 240 can map the calibrated effective digital representation $D_{eff}'(T)$ to temperature readout 245 for the second temperature signal. In some embodiments, temperature sensor 110 can use the one-point calibration to generate temperature readout 245 without a calibration block, which can further reduce the area of temperature sensor 110 and improve the accuracy of the temperature readout.

FIG. 10 illustrates a method 1000 for operating a CMOS-based temperature sensor with full band PSR, according to some embodiments. For illustrative purposes, the operations illustrated in method 1000 will be described with reference to the example CMOS-based temperature sensor 110 with full band PSR in FIGS. 2-8B. Additional operations may be performed between various operations of method 1000 and may be omitted merely for clarity and ease of description. Additional operations can be provided before, during, and/or after method 1000; one or more of these additional operations are briefly described herein. Moreover, not all operations may be needed to perform the disclosure provided herein. Additionally, some of the operations may be performed simultaneously or in a different order than shown in FIG. 10. In some embodiments, one or more other operations may be performed in addition to or in place of the presently described operations.

Referring to FIG. 10, method 1000 begins with operation 1010 to generate a reference voltage independent of temperature with a first set of MOS transistors. For example, as shown in FIG. 3, reference voltage generator 210 can generate reference voltage Vref 315 with devices 342, 344, 346, 348, 362, and 364. Reference Vref 315 can be independent of temperature according to equation (2). In some embodiments, devices 342, 344, 362, and 364 can be implemented with n-type MOS transistors and devices 346 and 348 can be implemented with p-type MOS transistors. In some embodiments, reference voltage Vref 315 can be a sum of the threshold voltage difference between devices 342 and 344 and the threshold voltage difference between devices 346 and 348. As described above, reference voltage Vref 315 can be independent of temperature and the power supply provided at input power supply node 301.

Referring to FIG. 10, in operation 1020, a temperature signal proportional to temperature is generated with a second set of MOS transistors operating under a substantially constant bias current. For example, as shown in FIG. 3, temperature signal Vptatn can be generated with devices 392 and 394. In some embodiments, devices 392 and 394 can be implemented with n-type MOS transistors and can operate under the substantially constant bias current Ibn. In some embodiments, devices 391 and 393 can act as a current source to provide the substantially constant bias current Ibn. Device 392 can have a first terminal electrically coupled to reference voltage Vref 315 and a second terminal electrically coupled to device 394 at node 301. The second terminal at node 301 can provide temperature signal Vptatn proportional to absolute temperature.

In some embodiments, temperature signal Vptatp can be generated with devices 396 and 398. In some embodiments, devices 396 and 398 can be implemented with p-type MOS transistors and can operate under the substantially constant bias current Ibp. In some embodiments, devices 395 and 397 can act as a current source to provide the substantially constant bias current Ibp. Device 396 can have a first terminal electrically coupled to reference voltage Vref 315 and a second terminal electrically coupled to device 398 at node 303. The second terminal at node 303 can provide temperature signal Vptatp proportional to absolute temperature. In some embodiments, temperature signal Vptat can be generated with devices 392, 394, 396, and 398 and temperature signal Vptat can be a sum of temperature voltages Vptatn and Vptatp. In some embodiments, a pair of differential temperature signals Vptatn and Vptatp can provide an increased temperature slope and thus temperature sensitivity.

In some embodiments, as shown in FIG. 3, devices 391-398 of temperature front-end circuit 220 can be outside of the feedback loop of reference voltage generator 210 and can operate under substantially constant bias currents Ibn and Ibp. As a result, the PSRR of temperature sensor 110 can be improved by, for example, orders of magnitude. Additionally, decoupling temperature front-end circuit 220 from the feedback loop of reference voltage generator 210 can increase design flexibility. The substantially constant bias currents Ibn and Ibp and the loop bandwidth of reference voltage generator 210 can be designed independently to optimize the performance of temperature sensor 110.

Referring to FIG. 10, in operation 1030, a digital representation of the temperature signal is generated based on a sampling frequency modulated by a modulation frequency having a random variation. For example, as shown in FIGS. 3, 6, 7A-7B, and 8A-8B, phase-rotated sigma-delta ADC 230 can convert temperature signal 225 to digital representation 235 based on sampling frequency $F_{nTS}$ modulated by modulation frequency Fm with random variations. In some embodiments, the modulation frequency Fm can be generated by frequency generator 650, such as a free running ring oscillator. In some embodiments, frequency modulator 660 can modulate clock signal $T_{ext}$ with modulation signal Tm to generate the modulated sampling signal $F_{nTS}$. In some embodiments, with the modulated sampling frequency $F_{nTS}$, sigma-delta modulator can filter out the power supply noise around the multiples of the clock frequency of $F_{ext}$ and improve PSRR of temperature sensor 110. Additionally, the random variation of the modulation frequency Fm can lead to a random frequency shift of the modulated sampling frequency $F_{nTS}$ and thus further reduce the power supply noise and improve PSRR of temperature sensor 110.

In some embodiments, the generation of the digital representation of the temperature signal can be followed by the mapping of the digital representation to a temperature readout. For example, as shown in FIGS. 2 and 3, mapping circuit 240 can map the digital representation 235 of temperature signal 225 to temperature readout 245. In some embodiments, mapping circuit 240 can include a gain correction function to calibrate temperature readout 245 using a one-point measurement at room temperature, as described above in method 900. In some embodiments, using one-point calibration process in mapping circuit 240 for gain correction can reduce the area of temperature sensor 110 and improve the accuracy of temperature readout 245.

Embodiments of the present disclosure provide CMOS-based temperature sensor 110 with full band PSR. CMOS-based temperature sensor 110 can include CMOS-based reference voltage generator 210, CMOS-based temperature front-end circuit 220, phase-rotated sigma-delta ADC 230, and mapping circuit 240. CMOS-based reference voltage generator 210 can use a low voltage digital power supply (e.g., about 0.5 V to about 0.9 V) to generate reference voltage Vref 315 that is independent of temperature and the digital power supply. CMOS-based temperature front-end circuit 220 can include first and second MOS devices 392 and 394. The first and second MOS devices 392 and 394 can operate under a substantially constant bias current Ibn generated by devices 391 and 393. Device 392 can include a first terminal electrically coupled to reference voltage Vref 315 and a second terminal electrically coupled to device 394. The second terminal can provide temperature signal Vptatn proportional to absolute temperature. In some embodiments, the MOS transistors disclosed herein can be fabricated on the same process node. In some embodiments, the substantially constant bias currents Ibn and Ibp in temperature front-end circuit 220 can improve the PSRR and temperature sensitivity of temperature front-end circuit 220.

In some embodiments, phase-rotated sigma-delta ADC 230 can be electrically coupled to reference voltage Vref 315 and temperature front-end circuit 220. Phase-rotated sigma-delta ADC 230 can convert temperature signal 225 to digital representation 235 with a modulated sampling frequency $F_{nTS}$. Phase-rotated sigma-delta ADC 230 can include a frequency generator 650 configured to generate a modulation frequency Fm having a random variation and to modulate the sampling frequency $F_{ext}$ with the modulation frequency Fm. The modulation frequency Fm can cause a frequency shift of the sampling frequency $F_{ext}$ and filter out the power supply noise around the sampling frequency, thus improving the PSRR of temperature sensor 110.

Mapping circuit 240 can map digital representation 235 of temperature signal 225 to temperature readout 245. In some embodiments, mapping circuit 240 can include a gain correction function to calibrate temperature readout 245 with a one-point measurement at room temperature. In some embodiments, calibrating using the one-point measurement without a calibration block can further reduce the area of temperatures sensor 110 and improve the accuracy of temperature readout 245.

Figure 11:
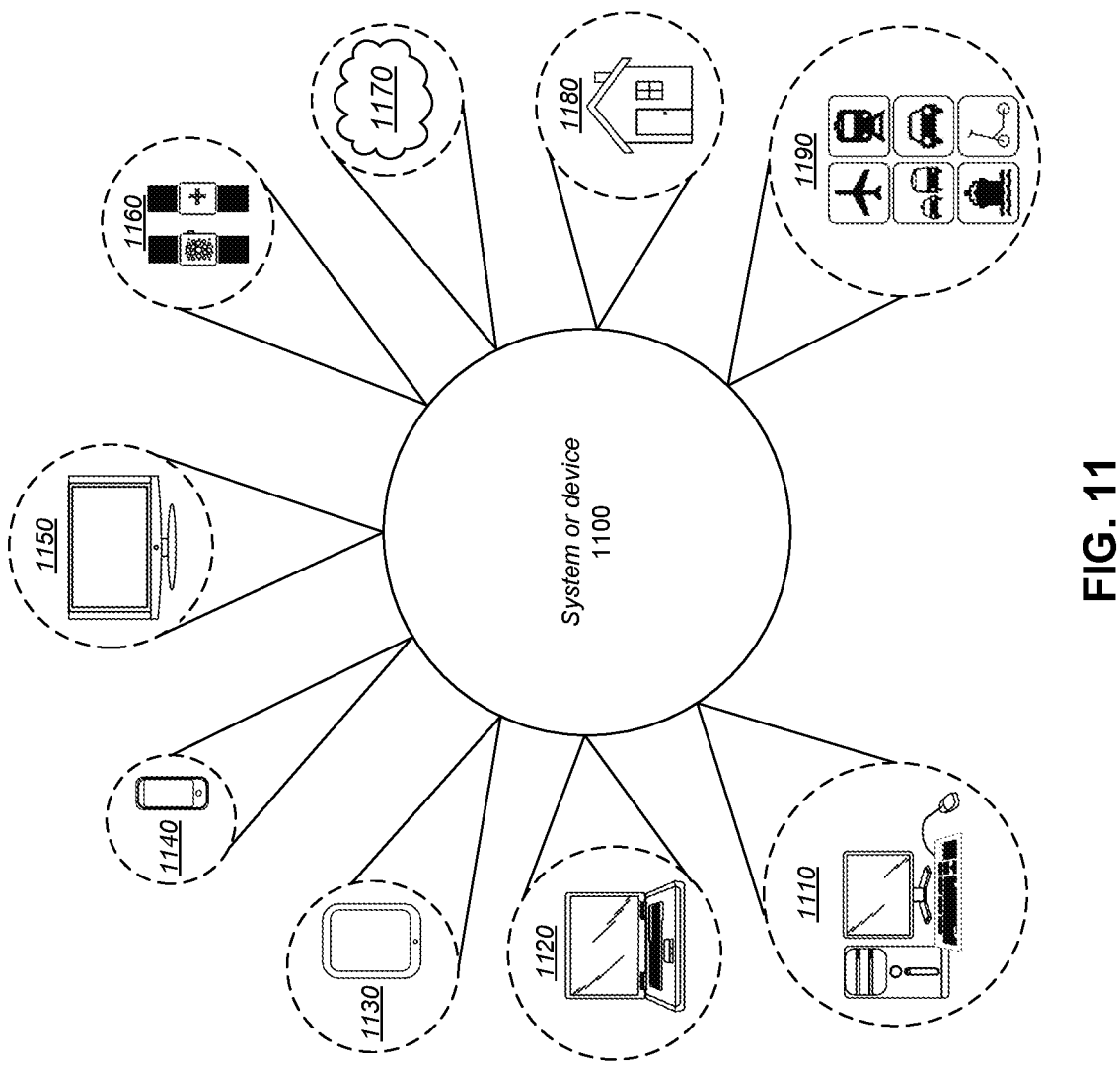
FIG. 11 illustrates various exemplary systems or devices that include embodiments of the disclosed CMOS-based temperature sensor with full band PSR, according to some embodiments Illustrative embodiments will now be described with reference to the accompanying drawings. In the drawings, like reference numerals generally indicate identical, functionally similar, and/or structurally similar elements.

FIG. 11 illustrates various exemplary systems of devices that include embodiments of the disclosed CMOS-based temperature sensor with full band PSR as described herein. System or device 1100, which can incorporate or otherwise utilize one or more of the techniques described herein, can be utilized in a wide range of areas. For example, system or device 1100 can be utilized as part of the hardware of systems such as a desktop computer 1110, a laptop computer 1120, a tablet computer 1130, a cellular or mobile phone 1140, or a television 1150 (or a set-top box coupled to a television).

Similarly, the disclosed embodiments can be utilized in a wearable device 1160, such as a smartwatch or a health-monitoring device. Smartwatches can implement a variety of different functions—for example, access to email, cellular service, calendar, health monitoring, etc. A wearable device can also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 can also be used in various other contexts. For example, system or device 1100 can be utilized in the context of a server computer system, such as a dedicated server or on shared hardware that implements a cloud-based service 1170. Still further, system or device 1100 can be implemented in a wide range of specialized devices, such as home electronic devices 1180 that includes refrigerators, thermostats, security cameras, etc. The interconnection of such devices is often referred to as the "Internet of Things" (IoT). Elements can also be implemented in various modes of transportation. For example, system or device 1100 can be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation, portable gaming devices, music players, data storage devices, unmanned aerial vehicles, etc.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:
   a reference voltage generator configured to generate a reference voltage;
   a temperature circuit configured to operate under a substantially constant bias current and to generate a temperature signal proportional to temperature; and
   an analog-to-digital converter (ADC) electrically coupled to the reference voltage generator and the temperature circuit and configured to convert the temperature signal to a digital representation based on a modulated sampling frequency, wherein the ADC comprises a frequency generator configured to generate a modulation frequency having a random variation, and wherein the modulated sampling frequency is generated based on the modulation frequency.

2. The circuit of claim 1, wherein the reference voltage generator comprises a first transistor having a first threshold voltage and a second transistor having a second threshold voltage, and wherein the reference voltage is independent of temperature and generated based on a difference between the first threshold voltage and the second threshold voltage.

3. The circuit of claim 2, wherein the temperature circuit further comprises third and fourth transistors configured to operate under an additional substantially constant bias current and to generate an additional temperature signal proportional to temperature, wherein:

the third transistor comprises third and fourth terminals;
the third terminal is electrically coupled to the reference voltage;
the fourth terminal is electrically coupled to the fourth transistor;
the fourth terminal is configured to provide the additional temperature signal; and
the digital representation is generated based on a pair of differential inputs of the temperature signal and the additional temperature signal.

4. The circuit of claim 1, wherein the temperature circuit comprises a first transistor and a second transistor connected in series and configured to operate under the substantially constant bias current, wherein:

the first transistor comprises first and second terminals;
the first terminal is electrically coupled to the reference voltage;
the second terminal is electrically coupled to the second transistor; and
the second terminal is configured to provide the temperature signal.

5. The circuit of claim 4, wherein the temperature circuit further comprises a third transistor and a fourth transistor connected in series and configured to provide the substantially constant bias current for the first and second transistors.

6. The circuit of claim 1, wherein the frequency generator comprises a ring oscillator.

7. The circuit of claim 1, further comprising a start-up circuit configured to generate a start-up current with an enable signal and an enable delay signal, wherein the enable delay signal is based on a delay of the enable signal by a period of time.

8. The circuit of claim 1, further comprising a supply independent biasing circuit configured to provide a first substantially constant bias current for the temperature circuit and a second substantially constant bias current for the reference voltage generator, wherein the first and second substantially constant bias currents are independent of a power supply.

9. The circuit of claim 1, further comprising a mapping circuit configured to map the digital representation to a temperature readout and to calibrate the temperature readout with a one-point measurement.

10. The circuit of claim 9, wherein the one-point measurement is representative of the temperature readout at a room temperature.

11. A metal-oxide-semiconductor (MOS)-based temperature sensor, comprising:

a reference voltage generator configured to generate a reference voltage with a first plurality of MOS transistors;

a temperature circuit configured to generate a temperature signal with a second plurality of MOS transistors, wherein the temperature circuit comprises a current source configured to generate a substantially constant bias current for the second plurality of MOS transistors; and an analog-to-digital converter (ADC) electrically coupled to the reference voltage and the temperature circuit and configured to sample the temperature signal with a modulated sampling frequency generated based on a modulation frequency having a random variation.

12. The MOS-based temperature sensor of claim 11, wherein the current source comprises a third plurality of MOS transistors, and wherein gate terminals of the second and third plurality of MOS transistors are electrically connected.

13. The MOS-based temperature sensor of claim 11, wherein the temperature circuit is configured to generate the temperature signal based on a voltage difference between n-type MOS transistors in the second plurality of MOS transistors configured to operate under the substantially constant bias current and p-type MOS transistors in the second plurality of MOS transistors configured to operate under an additional substantially constant bias current.

14. The MOS-based temperature sensor of claim 11, wherein the reference voltage generator further comprises:

a supply independent biasing circuit configured to provide the substantially constant bias current for the second plurality of MOS transistors, wherein the substantially constant bias current is independent of a power supply; and a start-up circuit configured to generate a start-up current for the first plurality of MOS transistors with an enable signal and an enable delay signal.

15. The MOS-based temperature sensor of claim 11, further comprising a mapping circuit configured to generate a temperature readout and to calibrate the temperature readout with a one-point measurement.

16. A method, comprising:

generating, with a first plurality of metal-oxide-semiconductor (MOS) transistors, a reference voltage independent of temperature;

generating, based on the reference voltage, a temperature signal proportional to the temperature with a second plurality of MOS transistors operating under a substantially constant bias current; and generating a digital representation of the temperature signal based on a modulated sampling frequency generated based on a modulation frequency having a random variation.

17. The method of claim 16, wherein generating the reference voltage comprises generating the reference voltage based on a difference between threshold voltages of two MOS transistors in the first plurality of MOS transistors.

18. The method of claim 16, wherein generating the temperature signal comprises providing an n-type temperature signal with two n-type MOS transistors in the second plurality of MOS transistors operating under the substantially constant bias current and a p-type temperature signal with two p-type MOS transistors in the second plurality of MOS transistors operating under an additional substantially constant bias current.

19. The method of claim 16, further comprising:

generating, via a start-up circuit, a start-up current for the first plurality of MOS transistors with an enable signal and an enable delay signal; and generating, via a supply independent biasing circuit, the substantially constant bias current that is independent of the power supply.

20. The method of claim 16, further comprising:

mapping the digital representation to a temperature readout; and calibrating the temperature readout with a one-point measurement.

* * * * *